Oct. 25, 1927.  
J. P. HAYES  
1,646,693  
PNEUMATIC TIRE APPLIANCE  
Filed March 22, 1926

Inventor:  
Joseph P. Hayes,

Patented Oct. 25, 1927.

1,646,693

UNITED STATES PATENT OFFICE.

JOSEPH P. HAYES, OF CHICAGO, ILLINOIS.

PNEUMATIC-TIRE APPLIANCE.

Application filed March 22, 1926. Serial No. 96,412.

This invention which is concerned with a pneumatic tire relates more particularly to a means which is interposed between the outer casing and inner tube of the tire for imparting thereto a resilient support the need of which varies inversely with the pressure of air within the tire.

This resilient support may be in the form of an inner-lining which can be made and installed at small expense. Chief among its advantages is a prolonged serviceable life to the tire, prevention of tire collapse in case of air failure therein, and protection in a substantial degree against punctures to the tire.

Figure 1:
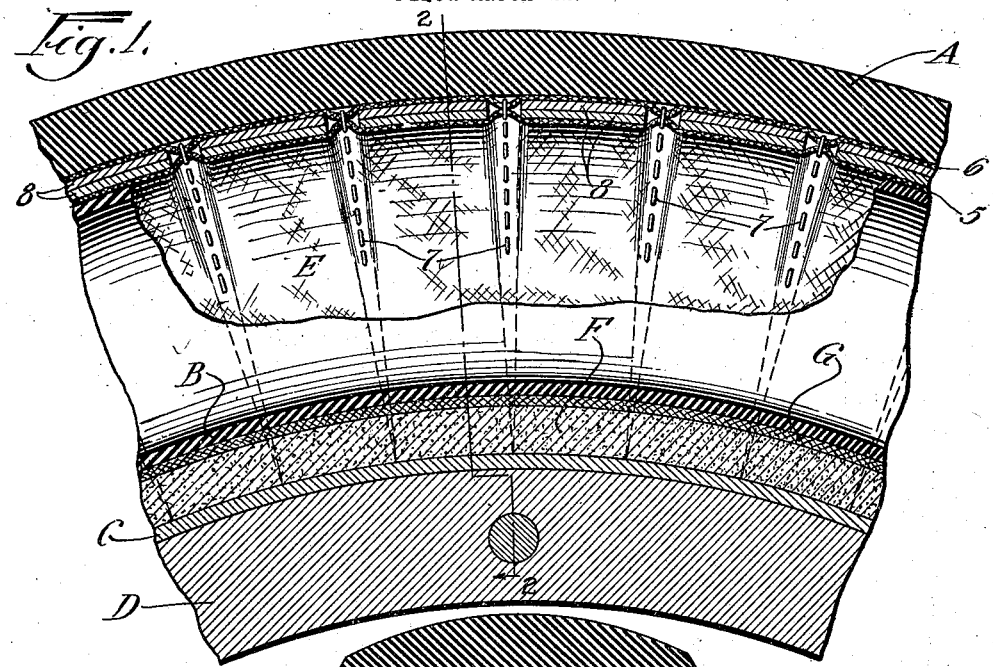
Figure 2:
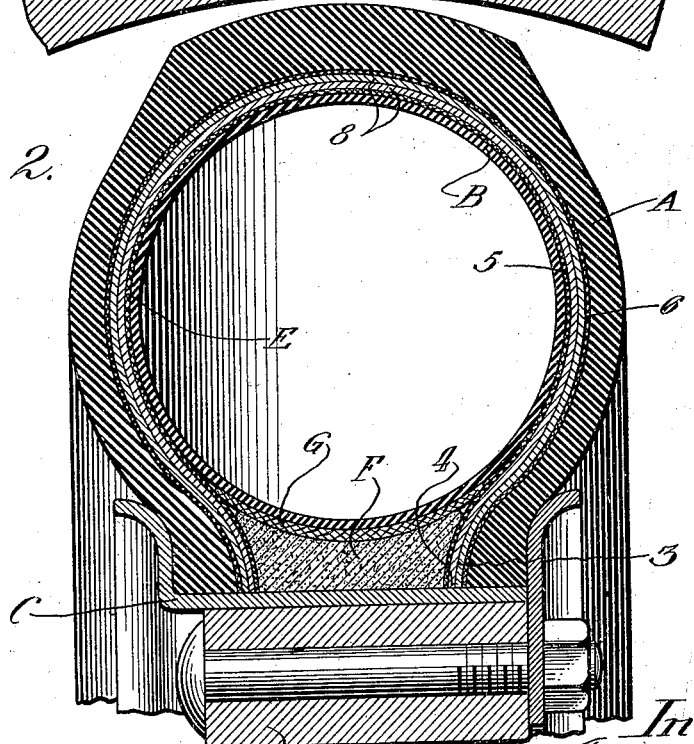

An exemplification of this invention in a preferred form is shown in the accompanying drawing wherein Fig. 1 is a circumferential fragmentary section through the tire and associated rim and felly; and Fig. 2 is a transverse section therethrough taken on line 2—2 of Fig. 1.

I have illustrated herein a conventional tire construction in which is embodied an outer casing A surrounding a tube B adapted to be inflated with air. The sides of the casing which are straight may be confined within and rested upon a rim C detachably secured to a wheel felly D. With a tire of this general description, may be associated an innerlining E which is interposed between the casing and tube in such manner as to follow the curvature of the inner face of the former whereby its side walls 3 are aligned in substantially parallel relation with their edges 4 rested against the rim. Between the two walls of this innerlining is arranged a filler block F which serves to hold the innerlining closely adjacent the walls of the casing, and as this filler extends from the rim to the inner tube, it serves additionally to support the latter at a point which is spaced from the rim. A flap G may be placed between this filler and tube, as shown.

The innerlining may comprise inner and outer flexible plies 5 and 6, preferably of fabric, and stitched or otherwise fastened together transversely of the tire at spaced equidistant points 7. This connection between the two plies or layers of the innerlining may extend half way around the tire through the region of its tread, as shown in Fig. 1. In this manner I provide a series of separated pockets extending transversely around the tire between the casing and the tube.

In each pocket of the innerlining is placed one or more bands 8 of resilient metal, the band ends being coterminus with the edges 4 of the innerlining. In this manner a large number of resilient supports are provided, each extending completely around the tire and each rested against the rim whereon the tire is mounted. These several bands are preferably so tensioned as to require the application of an appreciable compression when the innerlining is assembled in place.

A tire which is equipped with an appliance of the character described is protected circumferentially over most of its surface against puncturing from outside sources. Additionally the tire is provided with a resilient support, independent of that furnished by pressure of air within the tube, capable of sustaining the vehicle load in case of air deflation. A vehicle having tires so equipped may proceed safely without danger of accident in case of sudden air failure in any of its tires, and may continue on its way without detriment thereto until a convenient opportunity is afforded of making a tire change. The construction of the innerlining is such as to facilitate its ready accommodation to the tire.

It will be noted in the present application that movement of each of its resilient components may take place independently of the others; also, where two or more bands are arranged in the same pocket without mutual connection, each of these components may move relative to the other, as required by conditions of road travel. All this makes far easier riding while affording to the tire a cushion support which supplements that furnished by the air compressed within the tube.

I claim:

1. In combination with a tire having a tube surrounded by a casing which is mounted on a rim, an innerlining disposed between the casing and tube and conforming to the inner face of the former, the innerlining being provided adjacent the rim with substantially parallel walls the edges of which rest squarely against the rim, a filler between the walls of the innerlining and extending from the rim to the tube, and a plurality of resilient supports arranged circumferentially of the tire each extending transversely thereof with its two opposite ends against the rim, the innerlining being provided with pockets wherein such supports are individually contained, substantially as described.

2. In combination with a tire having a tube surrounded by a casing which is mounted on a rim, an innerlining extending around the tire between the casing and the tube and bearing against the rim, and a plurality of resilient supporting means loosely secured within the innerlining and each movable relative to the others, each of said supporting means having two ends bearing directly against the rim, and each surrounding the tube, substantially as described.

3. In combination with a tire having a tube surrounded by a casing the walls of which are rested on a rim, an innerlining between the casing and tube and conforming to the curvature of the former, the innerlining comprising two layers of flexible material connected at spaced points throughout the tread portion of the tire to provide individual pockets, a resilient supporting member disposed in each pocket and extending around the tire to present its two ends against the rim, and filler means disposed between the two walls of the innerlining, the rim, and tube, substantially as described.

4. In combination with a tire having a tube surrounded by a casing which is mounted on a rim, a plurality of independently movable resilient supports in the form of bands which surround the tube to the inner side of the casing, each of said bands having opposite ends rested on the rim at separated points, and a filler interposed centrally between the band ends, rim, and tube, whereby to hold these parts in fixed relation.

JOSEPH P. HAYES.